April 23, 1963 J. C. GAVIN 3,086,360
THRUST REVERSER CONTROL SYSTEM
Filed Feb. 2, 1959
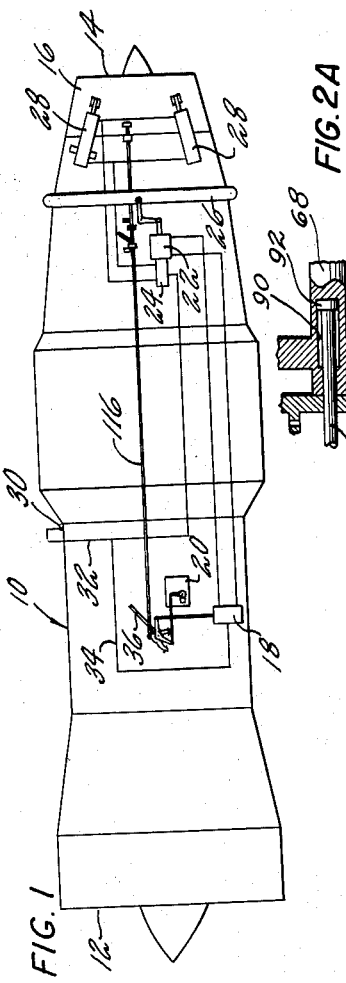
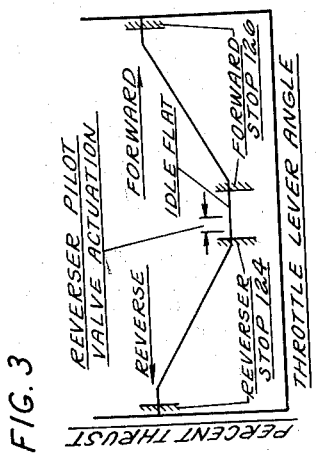
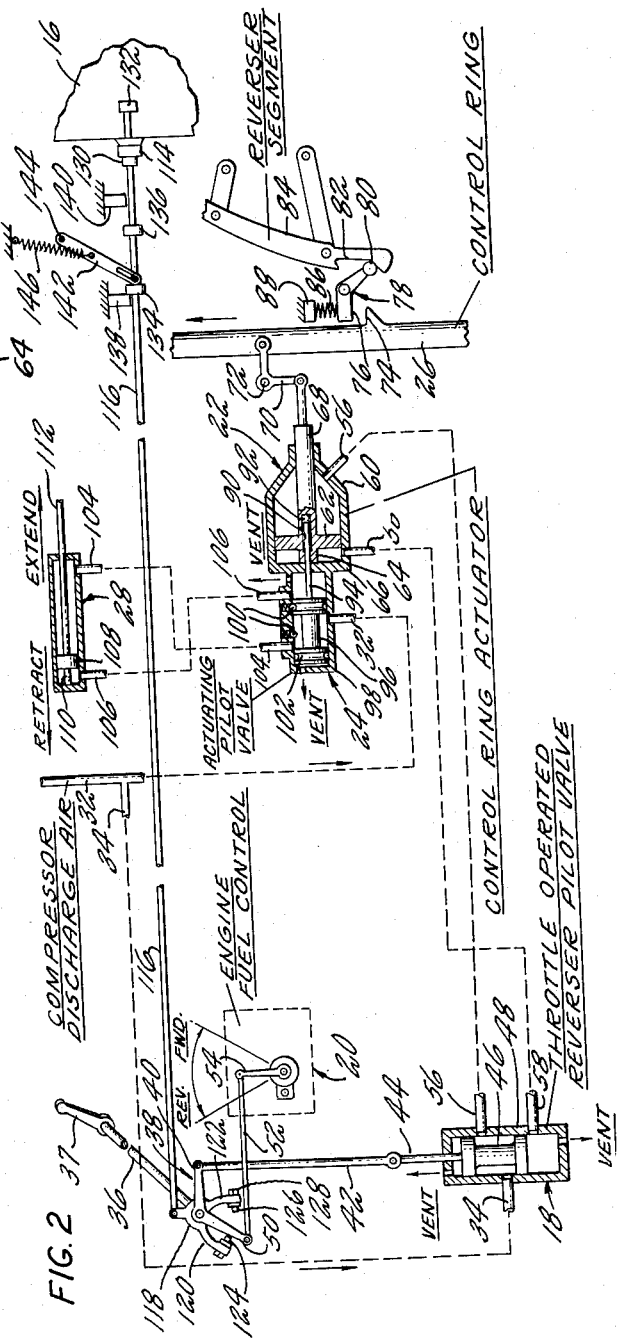
INVENTOR
JOHN C. GAVIN
BY
ATTORNEY United States Patent Office 3,086,360
Patented Apr. 23, 1963

3,086,360
THRUST REVERSER CONTROL SYSTEM
John C. Gavin, Glastonbury, Conn., assignor to United Aircraft Corporation, East Hartford, Conn., a corporation of Delaware
Filed Feb. 2, 1959, Ser. No. 790,578
5 Claims. (Cl. 60—35.54)

This invention relates to thrust reverser for gas turbine engines, more particularly to an improved thrust reverser control system.

An object of the invention is to provide an improved thrust reverser control system for a gas turbine engine.

Another object of the invention is to provide an improved thrust reverser control system which is of relatively simple design and of favorable weight.

Another object is to provide a thrust reverser control system for a gas turbine engine in which a throttle operated device controls an actuator connected to in-flight locks for a thrust reverser, the actuator in turn operating a device to extend or retract the reversers.

Another object of the invention is to provide a thrust reverser control system for a gas turbine engine in which a throttle operated pilot valve controls the admission of a motor fluid to an actuator controlling in-flight locks for a thrust reverser, the actuator in turn operating a pilot valve to admit a motor fluid to the reverser actuating system to extend or retract the reversers.

Still another object of the invention is to provide a thrust reverser control system for a gas turbine engine in which a throttle operated pilot valve controls the admission of a motor fluid to an actuator controlling in-flight locks for a thrust reverser, the actuator in turn operating a pilot valve to admit a motor fluid to the reverser actuating system to extend or retract the reversers, and in which a feedback from the reversers limit thrust increases until the reversers are in their desired position.

Other objects and advantages will be apparent from the following specification and claims, and from the accompanying drawing which illustrates an embodiment of the invention.

In the drawing:

FIG. 1 shows a gas turbine engine having my thrust reverser control system mounted thereon.

FIG. 2 shows a schematic layout of my thrust reverser control system.

FIG. 2A is an enlarged view of a detail of FIG. 2.

FIG. 3 shows a plot of throttle lever sequence with the thrust limit stops superimposed thereon.

Referring to the drawing in detail, in FIG. 1 a gas turbine engine is indicated generally at 10, the engine having inlet 12 and exhaust nozzle 14. The exhaust nozzle end of the engine is surrounded by a pair of semicircular members 16 constituting what is known as a clamshell reverser, the reversers normally constituting part of the power plant housing. The reversers are hingedly mounted so that by appropriate linkage they may be extended to a position intercepting the exhaust gas flow from nozzle 14, and by virtue of their shape the gas stream is diverted from its normal path and turned so as to provide thrust reversal. A jet engine thrust reverser of this type is disclosed in Drakeley Patent No. 2,839,891 issued June 24, 1958.

Components of the thrust reverser control system are mounted on the housing for engine 10 and include throttle operated reverser pilot valve 18, fuel control 20, control ring actuator 22, actuating pilot valve 24, in-flight lock control ring 26 surrounding the engine and actuating cylinders 28, the latter having a connection with reversers 16 for extending or retracting them. Compressor discharge air pressure is bled from the engine at pressure station 30 for use as a motor fluid in the reverser control system, and ducted by conduit 32 to actuating pilot valve 24 and by branch conduit 34 to reverser pilot valve 18.

FIGURE 2 shows the details of the thrust reverser control system. Cross-shaft 36 is connected to and rotated by throttle lever 37, bell crank 38 being fixedly connected to the cross-shaft for rotation therewith. Arm 40 of the bell crank is connected by link 42 to stem 44 on piston 46 so that the piston may be raised or lowered in casing 48. Arm 50 of bell crank 38 is connected by link 52 to lever 54 on fuel control 20 to coordinately control fuel flow to the engine.

Compressor discharge air pressure is admitted to the interior of casing 48 by branch conduit 34, and the pressure is directed to conduit 56 when piston 46 is in its upper position in casing 48 or to conduit 58 when the piston is in its lower position in the casing. Conduits 56 and 58 are connected to casing 60 of control ring actuator 22, admitting compressor discharge pressure to opposite sides of piston 62 within the casing. The piston has extension 64 extending from its left face which will abut wall 66 and limit movement of the piston to the left. Rod 68 extends from the right face of the piston and is connected to one arm of bell crank 70 pivoting about fulcrum 72. The other arm of the bell crank is connected to in-flight lock control ring 26 for rotating the ring in a plane perpendicular to the axis of the engine 10.

Shoulder 74 on the control ring is adapted to contact one face of arm 76 on bell crank 78 when the control ring moves in an upward direction. The other arm of the bell crank terminates in ball 80 which engages locking slot 82 on reverser segment 84 to lock the reversers in retracted or stowed position. Spring 86 is mounted between the upper face of arm 76 and fixed surface 88 and tends to maintain ball 80 in locking slot 82.

As can best be seen in FIG. 2A, piston 62 and rod 68 have chamber 90 therein containing head 92 which is connected by rod 94 to piston 96 in casing 98 of actuating pilot valve 24. Rod 94 extends through an opening in the left end wall of chamber 90. Head 92 and chamber 90 provide a lost motion connection between piston 62 and piston 96. The connection is so constructed that piston 62 will move a predetermined distance to the right before the end of the chamber engages the head and moves piston 96 to the right. Similarly, when both pistons are in their extreme position to the right piston 62 will move a predetermined distance to the left before piston 96 starts to move in that direction. Spring loaded ball 100 engages groove 102 in each of the lands on piston 96 and prevents the piston from being prematurely shifted by friction between the walls of chamber 90 and head 92.

Compressor discharge pressure is admitted to the interior of actuating pilot valve casing 98 by conduit 32, and the pressure is directed to conduit 104 when piston 96 is in its left position in casing 98 or to conduit 106 when the piston is in its right position in the casing. Conduits 104 and 106 are connected to actuating cylinders 28 for the reversers, admitting compressor discharge pressure to opposite sides of piston 108 within each cylinder. The piston has extension 110 extending from its left face to limit movement of the piston to the left, and rod 112 extending from its right face to connect with reversers 16. Movement of the piston to the right will extend the reverser and movement to the left will retract the reverser to stowed position.

A feedback from the reverse is provided to indicate the physical position of the reversers and limit engine power increase until the reverser is extended or retracted. Reverser 16 has flange 114 thereon supporting one end of feedback rod 116. The other end of the feedback rod is connected to bifurcated lever 118 which is coaxially mounted on cross-shaft 36 adjacent to bell crank 38. Each of the arms 120 and 122 of the lever contains a projection defining stops 124 and 126, respectively, limiting the travel of arm 50 on bell crank 38, stop 124 limiting clockwise rotation of the bell crank and stop 126 limiting counterclockwise rotation of the bell crank. Screw 128 may be provided for either one or both of the stops for variably controlling the limits of rotation of the bell crank.

The portion of feedback rod 116 passing through flange 114 is provided with a pair of abutments, 130 and 132, on opposite sides of the flange and spaced apart to provide a lost motion connection between reverser 16 and the rod. In addition a pair of spaced abutments 134 and 136 are located on the feedback rod between fixed stops 138 and 140 on the engine housing. Lever 142 is pivotably connected to feedback rod 116 between abutments 134 and 136 and is fulcrumed at 144. Over-center spring 146 is connected at one end to the engine housing and at its opposite end to a midportion of lever 142. Abutments 134 and 136, the fixed stops, the lever and the spring prevent the feedback rod from being prematurely shifted by friction between flange 114 and the rod.

Operation

The components of the thrust reverser control system are shown in FIG. 2 in the retracted or stowed position. To extend the reverser the throttle lever attached to cross-shaft 36 is moved from idle position to rotate the cross-shaft and bell crank 38 in a clockwise direction until arm 50 abuts stop 124. This motion of the bell crank does two things; one is to rotate lever 54 on fuel control 20 and the other is to lower piston 46 in reverser pilot valve 18. The purpose of stop 124 is to prevent a thrust increase before the reverser is in extended position and, therefore, the initial rotation of fuel control lever 54 should have little if any effect on fuel flow to the engine. As piston 46 is lowered the lands thereon cut-off communication between branch conduit 34 and conduit 56 and connect the branch conduit and conduit 58 to admit compressor discharge pressure to the left of piston 62 in control ring actuator 22. Downward travel of piston 46 will be sufficient to vent the right side of piston 62 through conduit 56 and a suitable opening in reverser pilot valve, casing 48.

The pressure differential across piston 62 will move the piston to the right and rotate bell crank 70 in a counter-clockwise direction to rotate control ring 26 in an upward direction. As the control ring rotates shoulder 74 contacts arm 76 and rotates bell crank 78 in a clockwise direction to move ball 80 out of locking slot 82, thus releasing the in-flight lock. As piston 62 continues to move to the right the left end wall of chamber 90 will contact the left edge of head 92 which is connected to piston 96 by rod 94 to move piston 96 to the right.

When piston 96 moves to the right the lands thereon cut-off conduit 104 from, and connect conduit 106 with, conduit 32 to admit compressor discharge pressure through conduit 196 to the space at the left of piston 108 in actuating cylinder 28. At the same time the space at the right of piston 108 is vented through conduit 104 and a suitable opening in actuating pilot valve casing 98. The pressure differential across piston 108 will move the piston and rod 112 to the right to extend reversers 16.

As reversers 16 move to their extended position flange 114 slides along feedback rod 116, the rod being held in its initial position by over-center spring 146 which acts through lever 142 to maintain abutment 134 on the rod against fixed stop 138. When the reverser has moved a sufficient distance to insure its assuming the extended position, flange 114 contacts abutment 132 and feedback rod 116 will be moved to the right. This movement of the rod rotates bifurcated lever 118 in a clockwise direction about cross-shaft 36 and moves stop 124 away from arm 50. Movement of feedback rod 116 and rotation of lever 118 is terminated when abutment 136 on the rod contacts fixed stop 140.

The displacement of stop 124 from a limiting position with respect to clockwise movement of arm 50 on bell crank 38 permits the bell crank to be advanced further in a clockwise direction as far as the new position of the stop. This further clockwise rotation of the bell crank rotates fuel control lever 54 to increase fuel flow to the engine and thus increase the power developed by the engine. The movement of the bell crank also lowers piston 46 in reverser pilot valve 18, but this has no effect on the reverser control system.

To retract the eyelids from the extended position cross-shaft 36 and bell crank 38 are rotated in a counterclockwise direction. By virtue of the angular spacing of stops 124 and 126 on bifurcated lever 118, bell crank 38 can be rotated from its reverser extended-full power position to its reverser extend-idle position before retracting operation is initiated and arm 50 contacts stop 126. This stop is so positioned that the reversers may be retracted, as will be explained below, but fuel flow to the engine is prevented from being increased until the reverser has been fully retracted.

The counterclockwise movement of bell crank 38 rotates fuel control lever 54 and raises piston 46 in reverser pilot valve 18 from its lower, reverser extending position. The lands on piston 46 will cut-off communication between branch conduit 34 and conduit 58 as the piston raises and connect the branch conduit and conduit 56 to admit compressor discharge pressure to the right side of control ring actuator piston 62. The pressure differential across the piston will move it to the left which will result in control ring 26 rotating in a downward direction. Shoulder 74 on the control ring will move away from arm 76 and spring 86 will restore bell crank 78 to its locking position.

When piston 62 has moved sufficiently far that bell crank 78 has been restored to its locking position, the end wall of chamber 90 will contact head 92 and piston 96 will begin moving to the left. This movement of piston 96 will cut-off compressor discharge pressure from conduit 106 and admit it to conduit 104 and the space at the right of piston 108. The pressure differential across piston 108 will move the piston and rod 112 to the left to retract reversers 16.

As reversers 16 move to their retracted position flange 114 slides along feedback rod 116 until the flange contacts abutment 130, the feedback rod being restrained against premature motion by over-center spring 146 and lever 142 acting against abutment 136 on the rod. When flange 114 contacts abutment 130 the feedback rod will be moved to the left to rotate bifurcated lever 118 in a counterclockwise direction about cross-shaft 36, displacing stop 126 to a new position. Bell crank 38 there can be advanced further in a counterclockwise direction as far as the new position of the stop, increasing fuel flow to the engine and thus increasing the power developed by the engine.

As the reversers 16 approach the retracted or stowed position, reverser segment 84 moves to engage in flight locking slot 82 with ball 80 which will remain engaged until the next actuation cycle of the reverser system.

FIGURE 3 is a throttle lever angle plot of the extending and the retracting action described above. When the throttle lever is against its idle stop operation will be on the idle flat shown. As the throttle lever is moved in a reverse thrust or reverser extending direction against reverser stop 124 the reverser pilot valve is actuated but no increase in thrust occurs. As soon as the reverser is extended the stop is displaced to a new position and the throttle lever then may be moved further in the reverse thrust direction to increase engine thrust to its maximum limit.

When it is desired to retract the extended reversers the throttle lever is moved in a forward thrust or reverser retracting direction. The reverser pilot valve is actuated as the throttle lever moves along the idle flat to forward stop 126, but no increase in thrust occurs. As soon as the reverser is retracted the stop is displaced to a new position and the throttle lever then may be moved further in the forward thrust direction to increase engine thrust to its maximum limit.

It is to be understood that the invention is not limited to the specific embodiment herein illustrated and described, but may be used in other ways without departure from its spirit as defined by the following claims.

I claim:

1. A control system for a thrust reverser, said system including fuel control means and a first pilot valve, means for coordinately operating said fuel control means and said first pilot valve, means for admitting a motor fluid to said first pilot valve, an in-flight lock for said reverser, means for operating said in-flight lock in the locking and unlocking directions by the admission of motor fluid thereto from said first pilot valve, a second pilot valve, said second pilot valve having means for delayed operation in response to operation of said in-flight lock operating means, means for admitting a motor fluid to said second pilot valve, and an actuating cylinder operatively connected with said reverser, said second pilot valve controlling the admission of motor fluid to said actuating cylinder to extend and retract said reverser.

2. A control system for a thrust reverser, said system including a first pilot valve, means for operating said first pilot valve, fuel control means actuated by said first pilot valve operating means, means for admitting a motor fluid to said first pilot valve, an in-flight lock for said reverser, a control ring for operating said in-flight lock, a control ring actuator including movable means for operating said control ring, said first pilot valve controlling the admission of motor fluid to said control ring actuator, a second pilot valve, said second pilot valve having a movable piston therein, a lost motion connection between said movable means and said movable piston, means for admitting a motor fluid to said second pilot valve, an actuating cylinder operatively connected with said reverser, said second pilot valve controlling the admission of motor fluid to said actuating cylinder, movable stop means limiting movement of first pilot valve operating means, feedback means connecting said reverser and said movable stop means, and a lost motion connection between said reverser and said feedback means for moving said movable stop means only when said reverser is in a preselected position.

3. A control system for a thrust reverser, said system including fuel control means and a first pilot valve, means for coordinately operating said fuel control means and said first pilot valve means for admitting a motor fluid to said first pilot valve, in-flight locks for said reverser, a control ring for operating said in-flight locks, a control ring actuator including movable means for operating said control ring, said first pilot valve controlling the admission of motor fluid to said control ring actuator, a second pilot valve, said second pilot valve having a movable piston therein, a lost motion connection between said movable means and said movable piston, means for admitting a motor fluid to said second pilot valve, an actuating cylinder operatively connected with said reverser, said second pilot valve controlling the admission of motor fluid to said actuating cylinder, movable stop means limiting movement of said coordinately operating means, feedback means connecting said reverser and said movable stop means, and a lost motion connection between said reverser and said feedback means for moving said movable stop means only when said reverser is in a preselected position.

4. A thrust reverser control system for a gas turbine engine having a fuel control, a compressor and a reverser, said system including a first pilot valve, means for coordinately operating said fuel control and said first pilot valve, means for admitting compressor discharge pressure from said engine to said first pilot valve, an in-flight lock for said reverser, a control ring surrounding said engine for operating said in-flight lock, a control actuator including movable means for operating said control ring, said first pilot valve controlling the admission of compressor discharge pressure to said control ring actuator to actuate said in-flight lock in the locking and unlocking directions, said second pilot valve, said second pilot valve having a movable piston therein, a lost motion connection between said movable means and said movable piston, means for admitting compressor discharge pressure from said engine to said second pilot valve, and an actuating cylinder operatively connected with said reverser, said second pilot valve controlling the admission of compressor discharge pressure to said actuating cylinder to extend and retract said reverser.

5. A thrust reverser control system for a gas turbine engine having a fuel control, a compressor and a reverser, said system including a first pilot valve, means for coordinately operating said fuel control and said first pilot valve, means for admitting compressor discharge pressure from said engine to said first pilot valve, an in-flight lock for said reverser, a control ring surrounding said engine for operating said in-flight lock, a control ring actuator including movable means for operating said control ring, said first pilot valve controlling the admission of compressor discharge pressure to said control ring actuator, a second pilot valve, said second pilot valve having a movable piston therein, a lost motion connection between said movable means and said movable piston, means for admitting compressor discharge pressure from said engine to said second pilot valve, an actuating cylinder operatively connected with said reverser, said second pilot valve controlling the admission of compressor discharge pressure to said actuating cylinder, movable stop means limiting movement of said coordinately operating means, feedback means connecting said reverser and said movable stop means, and a lost motion connection between said reverser and said feedback means for moving said movable stop means only when said reverser is in a preselected position.

References Cited in the file of this patent

UNITED STATES PATENTS

| 2,343,495 | Campbell | Mar. 7, 1944 |
| 2,664,959 | Stuart | Jan. 5, 1954 |
| 2,780,057 | Stavert | Feb. 5, 1957 |
| 2,839,891 | Drakeley | June 24, 1958 |
| 2,938,683 | Morrison | May 31, 1960 |
| 2,943,443 | Voymas et al. | July 5, 1960 |